UNITED STATES PATENT OFFICE.

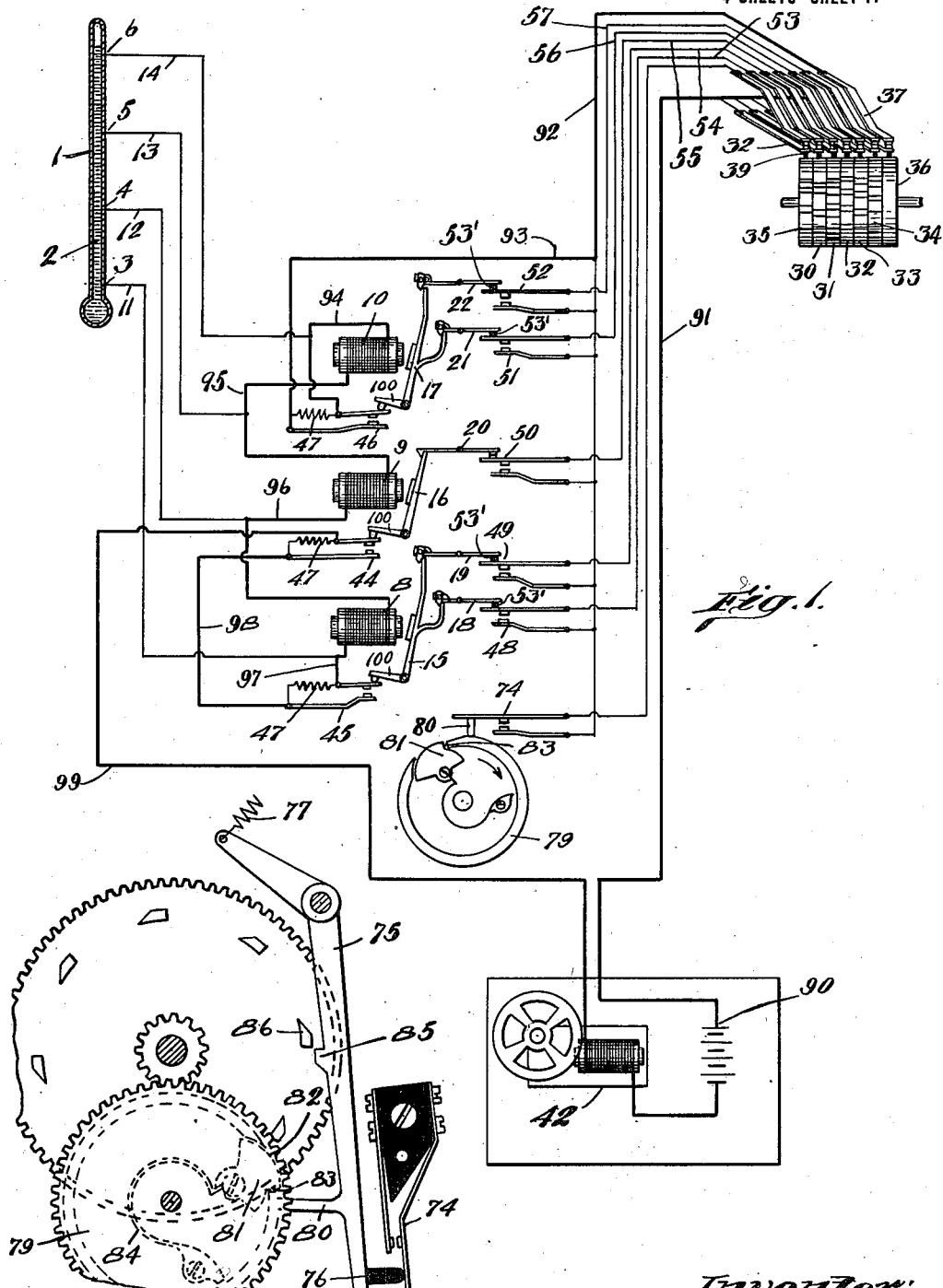

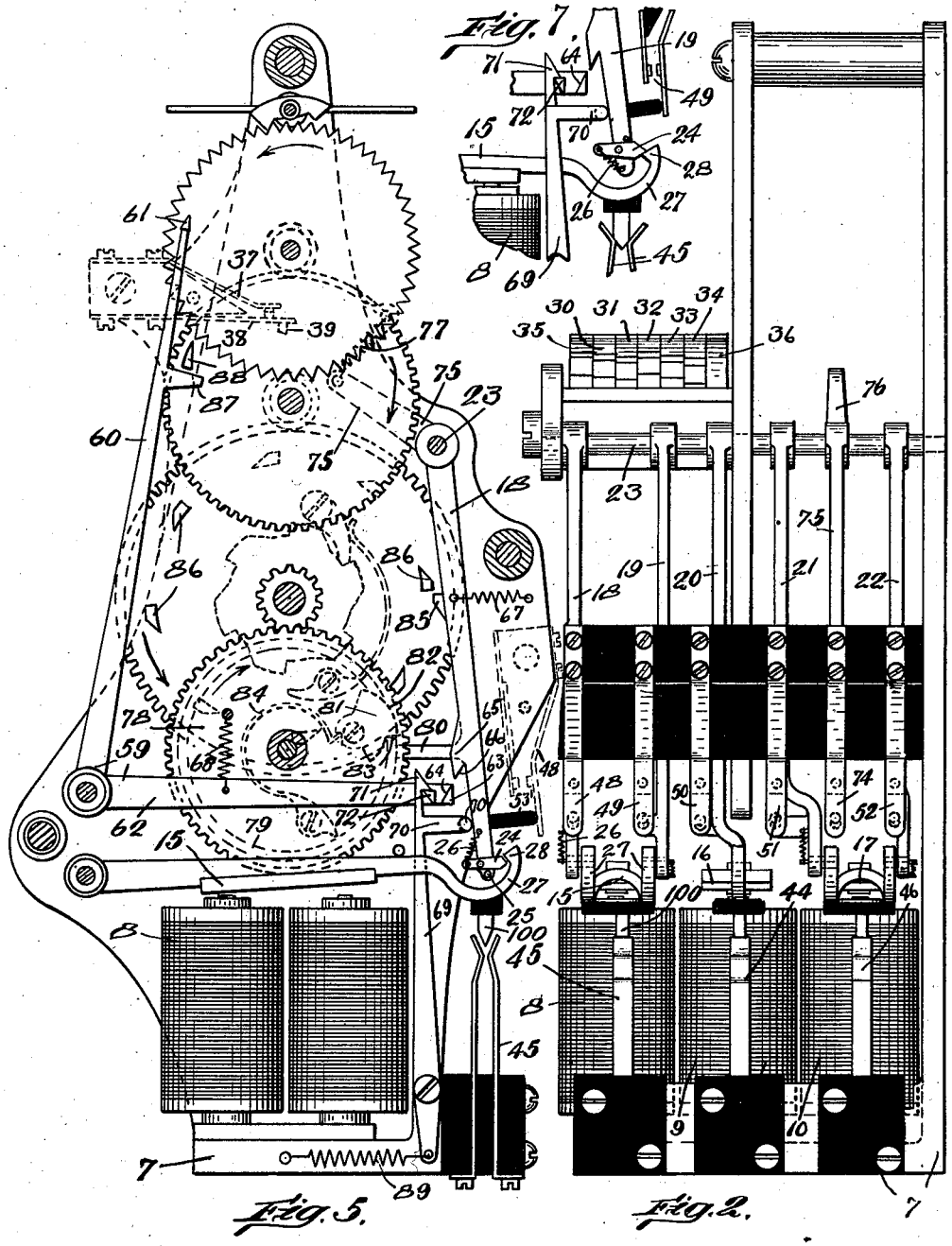

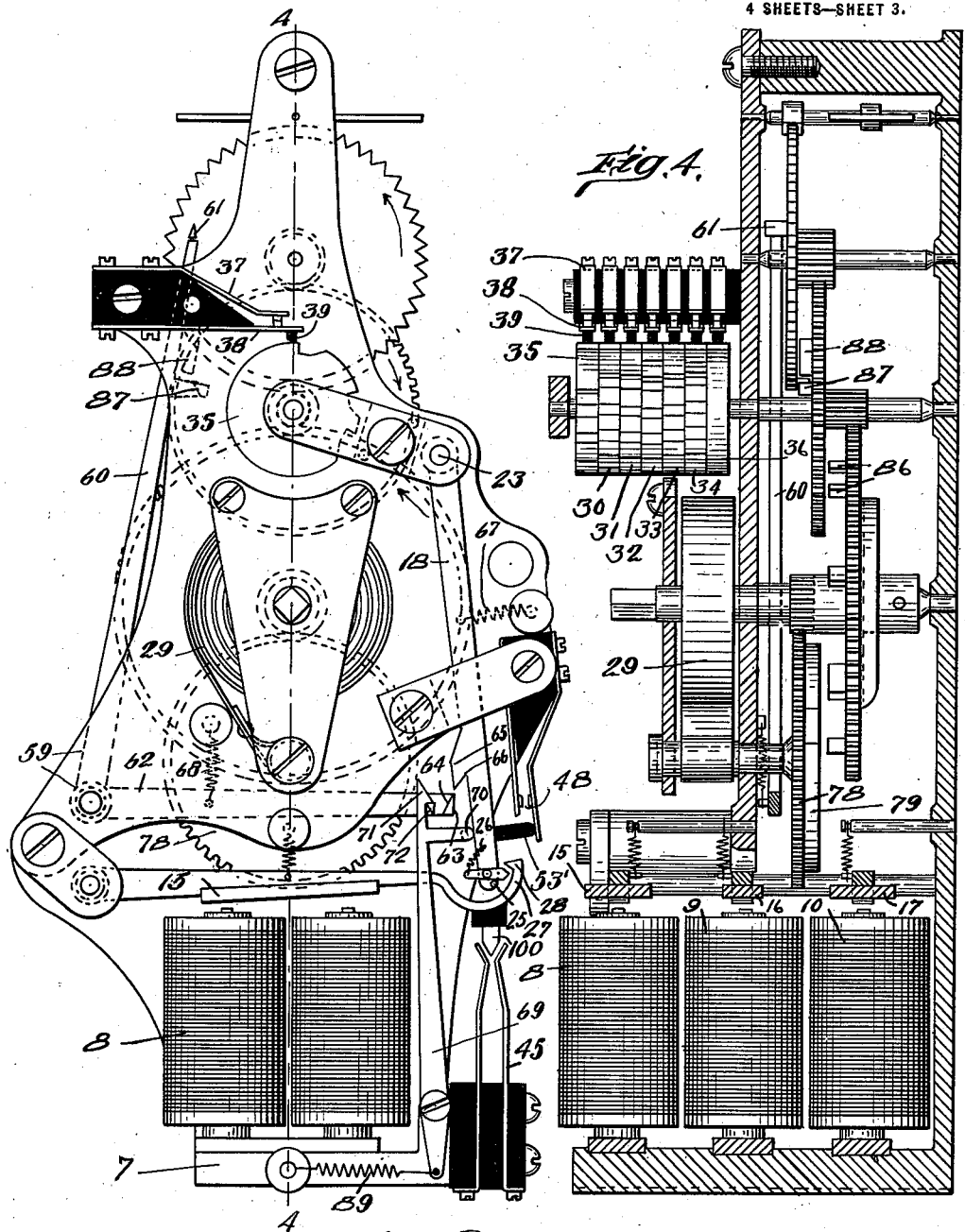

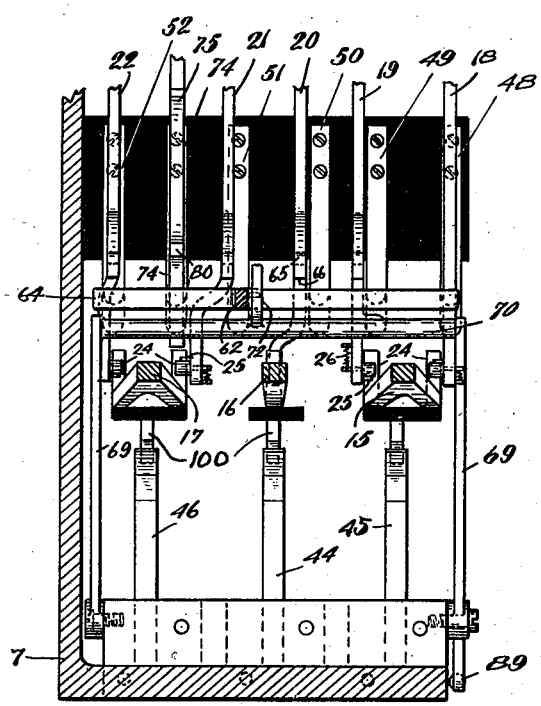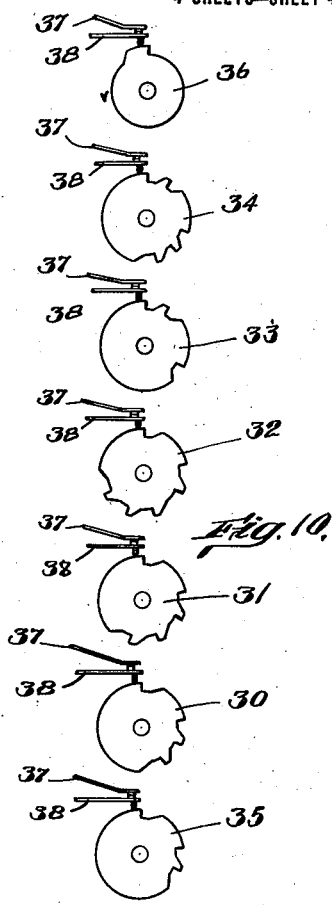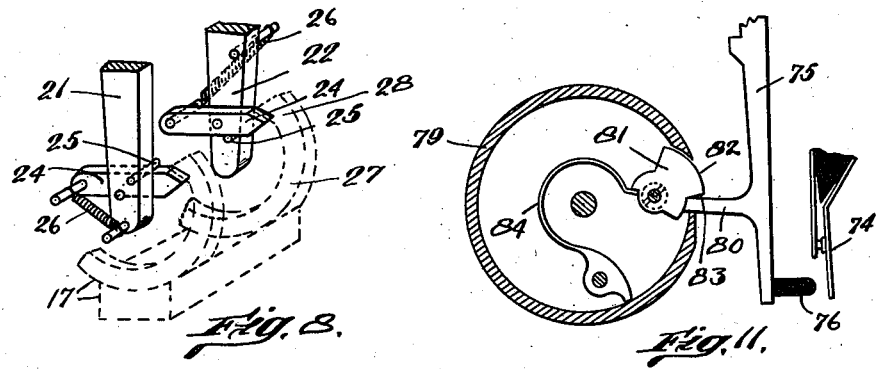

NATHAN H. SUREN, OF NEEDHAM, MASSACHUSETTS, ASSIGNOR TO GAMEWELL FIRE ALARM TELEGRAPH COMPANY, OF NEW YORK, N. Y., A CORPORATION OF NEW YORK.

TEMPERATURE-INDICATOR.

1,303,989.  Specification of Letters Patent.  Patented May 20, 1919.

Application filed February 6, 1915. Serial No. 6,575.

*To all whom it may concern:*

Be it known that I, NATHAN H. SUREN, a citizen of the United States, residing at Needham, in the county of Norfolk and State of Massachusetts, have invented an Improvement in Temperature-Indicators, of which the following is a specification.

This invention relates to a temperature indicator adapted for indicating or recording predetermined temperature points, and also whether the temperature is falling or rising when reaching or passing such predetermined points.

The invention is designed with a view to indicating or recording by electrical transmission at a more or less distant point the temperature conditions of a place to be protected, there being indicated or recorded predetermined temperature points, such as two extremes and an intermediate point, and also whether the temperature is rising or falling when passing such points. The recording of such temperature changes enabling a permanent record to be maintained in order that a complete knowledge of the temperature conditions extending over a period of time may be obtained.

A prime object of the invention is to provide means for the electrical transmission of the temperature changes and for recording the same which shall be of a simple, reliable character that may be controlled by an elementary form of thermal controller, such as an ordinary thermometer. To this end I provide a plurality of electro-magnetically operated switches corresponding in number with the number of temperature changes to be indicated or recorded which are arranged to be electrically controlled by the thermal controller, and a corresponding number of individualized controllers adapted for controlling the circuit of an indicating or recording instrument, which are selected for operation by said switches.

The thermal controller operates progressively to electrically control the switches, and consequently the switches are operated progressively to control the individualized controllers which cause operation of the indicating or recording instrument. In case the thermal controller is provided with three predetermined temperature points, to be indicated, there will be at least five selecting switches to indicate such points, and also whether the temperature is rising or falling when passing such points, all of which are here referred to as temperature changes, but I find that the operating magnets for said selecting switches may be reduced in number to the number of temperature points, to be indicated, say three, for instance, in the case cited, and yet operate all of the selecting switches by utilizing both the attractive and retractive movements of their armatures.

The foregoing and other objects and features of the invention will be better understood from the following detailed description taken in connection with the accompanying drawings and will be thereafter pointed out in the appended claims.

Referring to the drawings:—

Figure 1 indicates diagrammatically the controlling circuits and means for governing them through the thermostatic element.

Fig. 2 is a side elevation of the apparatus eliminating the circuits of the thermostatic element.

Fig. 3 is a front elevation of the same.

Fig. 4 is a vertical longitudinal section.

Fig. 5 is a transverse section.

Fig. 6 is an enlarged broken view in elevation illustrating particularly the signaling device for indicating the condition of the apparatus; and, Fig. 7 is a fragmentary detail showing parts coöperative with the magnet controlled levers.

Fig. 8 is a detail perspective view of the ends of one of the armature-levers and the lower ends of the levers which they control, showing particularly the manner in which the pawls of the levers are acted on by said ends.

Fig. 9 is a sectional view to be referred to.

Fig. 10 is a detail view of the individualized controllers and associated controllers for the circuit of the recorder.

Fig. 11 is a detail view partly in section of the means employed for selecting one of the associated controllers.

In the apparatus here shown, I have selected a high and a low temperature point, and also an intermediate or normal temperature point to be indicated, such selection being merely arbitrary, and the associated apparatus is designed particularly with a view to indicating these temperature changes at a distant point, yet such apparatus may be adjusted and increased in the event a greater number of arbitrary points are to be indicated. In the present instance, with the three arbitrary points to be indicated, and also the rising and falling condition of temperature, the apparatus is designed for five temperature changes to be indicated.

As a means for indicating the temperature at a particular point or place that is to be protected, I have shown an ordinary thermometer 1, utilizing the mercury column 2 therein as the movable circuit closing element though any thermostatically controlled element which may be utilized as a circuit-closer may be employed.

The thermostatic element has three electric contact-making points, 4, 5, and 6, being, in the instance shown, arranged to indicate low, normal and high temperature points, and also has a common electric contact-making point 3 which the mercury is designed at all times to cover.

The apparatus designed to be associated with a thermal controller and to be located in any desired position with relation thereto involves a suitable frame 7, on the base of which is mounted the respective electro-magnets 8, 9, and 10, these being three in number because three temperature points are designed to be indicated. These electro-magnets are arranged in series relation in the main circuit, represented by the heavy line, Fig. 1, and including the battery 90 and circuit-wires 91, 92, 93, 94, 95, 96, 97, 98, 99. Branch circuit-wires 11, 12, 13, 14 lead from said main-circuit to the thermostatic controller at the points designated, so arranged that the electro-magnets 8, 9, and 10 are adapted to be short-circuited progressively, as the mercury rises, and the short-circuits are opened progressively, as the mercury falls. The armatures of said magnets are borne, respectively, by levers 15, 16 and 17, and said levers control, respectively, switch-operating levers for the selecting switches 48, 49, 50, 51, and 52, five being here shown because there are five temperature changes to be indicated. The armature lever 15 of electro-magnet 8 controls two such levers as 18 and 19, the armature lever 16 of electro-magnet 9 controls one such lever, as 20, and the armature lever 17 of electro-magnet 10 controls two such levers, as 21 and 22. The respective levers 18, 19, 20, 21 and 22 are loosely mounted upon a rod 23, arranged transversely of the frame 7, above the electro-magnets, (see Fig. 5), the lower end of each lever being provided with an operating-dog 24, the dog on the lever 20 being fixed and all of the other dogs being pivotally supported and held against independent movement in one direction by a pin 25, while freely movable in the opposite direction, a spring 26 resisting such free movement with a strength necessary to normally hold the dog against the pin. The respective armature-levers are provided with operating-ends 27, here shown as hook-shape, the armature-levers 15 and 17 having two such ends and the armature-lever 16 having a single end. The operating-ends of the armature-levers are formed to present projections 28, to engage the dogs 24, and in those instances where the armature-levers are designed to engage two such dogs, the pins 25 are respectively mounted on opposite sides of the dogs, so that on movement of the armature-lever in one direction one lever will be operated, and on movement in the opposite direction the other lever will be operated. In this connection reference may be had particularly to Fig. 8, wherein the armature-lever 17, and the two levers 21 and 22 controlled by it are shown in detail. The pin 25 on the lever 21, is disposed to engage the upper edge of the pawl 24, and the pin 25, on the lever 22 is disposed to engage the lower edge of the pawl 24. The two ends of the armature-lever 17 will, respectively, engage with the pawls of the two levers upon retractile movement of the armature, and the one projection 28 will ride over the end of the pawl of the lever 22, since this pawl is free to swing against the tension of its spring; and the other projection 28 will not swing the pawl on the member 21 since this pawl is held against upward movement by the pin 25 thereof. As a result the inclined face of the projection 28 will ride over the inclined face of the pawl on the lever 21, causing this lever to swing inwardly. On the other hand the attractive movement of the armature-lever 17 will cause the lever 22 to be swung inwardly since its pawl is held against downward swinging movement, while the lever 21 will be unaffected, since the pawl of this lever may swing downward against the tension of its spring. In the particular instance shown and described, the energization of electro-magnet 8 causes actuation of lever 18, and deënergization thereof causes actuation of lever 19; energization and also deënergization of electro-magnet 9 causes actuation of lever 20; and energization of electro-magnet 10 causes actuation of lever 22, and deënergization thereof causes actuation of lever 21.

Mounted in the frame 7 is a gear-train, driven by a spring-motor 29, certain of the gear-wheels of which have additional functions as will later appear. Mounted upon one of the shafts of the train, which shaft is extended for the purpose, is a series of wheels 30, 31, 32, 33, and 34, which are differently formed or not to form elements of individualized controllers, there being additionally mounted on the shaft other wheels 35 and 36, which will be hereinafter more specifically referred to. Supported by the frame above each of the wheels is a circuit-controller, having upper and lover spring members 37 and 38, the lower member having an insulating point 39 normally bearing upon the wheel beneath it, so that with the particular notch formation of the respective wheels, the circuit controlled by said wheels is broken at predetermined intervals and a certain number of times and the recorder 42 will be caused to respond. Controlling switches 45, 44, 46, are associated with the respective magnets 8, 9, 10 and each of these is held closed while the magnet associated therewith is energized, by having a lateral extension 100 from the armature lever engaged therewith. The respective switches 44, 45, and 46, when closed, shunt out resistances 47, these resistances being employed to keep the line resistance approximately constant when the magnet is shunted, the resistance being cut into the line when the magnet is shunted and shunted when the magnet is energized by the operation of the respective armature levers 15, 16, 17, as they are drawn toward or retracted from, their respective magnets upon the energization or deënergization thereof. The upper members 37 of the circuit-controllers of the respective wheels 30, 31, 32, 33, and 34 are connected respectively to one member of the selecting switches which are designed to be operated by the switch-operating levers hereinbefore referred to. These switches, as 48, 49, 50, 51, and 52 have their movable members operated by projections 53' on the respective switch-operating levers 18, 19, 20, 21, and 22, said respective switches being located adjacent the levers for such operation. The selecting switches are in circuit with the respective circuit-controllers in the order named, by conductors 53, 54, 55, 56, and 57, these making connection with the return conductor 91.

The wheel 36, previously referred to is designed to maintain the main-circuit normally closed, having for this purpose a projection which maintains its particular circuit-controller in closed relation while the apparatus is at rest, see Fig. 10. The circuit-controller controlled by this wheel includes the main conductors. During operation of the apparatus, however, the circuit-controller controlled by the wheel 36 is opened so that the other wheels may control the circuit and make and break the latter in accordance with their formation.

The operation of the spring operated train is directly controlled through the actuation of any one of the switch-operating levers hereinbefore referred to in the following manner. A locking-lever 59 of approximately L-shape is mounted for swinging movement in the frame, the upright arm 60 thereof normally engaging underneath the projection 61 on one of the gears of the train to prevent operation of the train. The horizontal arm 62 of the locking lever extends over the electro-magnets terminating in a relatively transverse bar 63 having an inclined operating face 64 at its inner side, said bar being made quite long and the levers 18, 19, 20, 21 and 22, are all arranged immediately beyond said bar, and are each formed with a lug 65 having an inclined face 66, to coöperate with the face 64 as will later appear. The respective levers 18, 19, 20, 21, and 22 are moved to inoperative position by springs 67, while the locking lever is moved to a train-releasing position by a spring 68. An inverted U-frame 69 (see Fig. 9) is pivotally mounted on the electro-magnet base, extending above the same and having its forwardly projecting bar 70 arranged to coöperate with all of the switch-operating levers 18 to 22, a spring 89 being attached to said frame by which to hold the levers in inoperative or switch opening position in the normal condition of the apparatus. The frame has an upstanding projection 71 to engage with a lug 72 on the arm 62 of the locking lever, to normally hold the locking lever in normal position to prevent operation of the train.

The wheel 35 on the shaft bearing the wheels 30 to 34, coöperates with a circuit-controller, for the circuit of the recorder, to indicate when the gearing train needs rewinding. The upper end of the circuit-controller is in circuit with a switch 74 mounted on the frame and made similar to the selecting switches. This particular switch 74 (see Fig. 6) is controlled by a lever 75 supported similar to the switch-operating levers 18, 19, 20, 21, and 22, and having a projection 76, which, under the normal influence of the spring 77 holds the switch 74 open. Driven by the gearing train is a wheel 78 (see Figs. 6 and 11) a peripheral flange 79, on which a projection 80 of the lever 75 bears. The flange 79 is interrupted, and mounted on the wheel adjacent the interruption is a dog 81, having a cam surface 82, which fits in the interrupted portion, with one edge thereof, as 83, projecting beyond the surface of said flange in the direction of rotation of the wheel. The dog is spring-pressed to normally fill the interrupted portion of the flange through the spring 84. The lever 75 is provided with a projection 85, designed to be engaged by any one of the series of lugs 86 carried on a gear of the train, the gear rotating to actuate the lever 75 in a direction away from the wheel 78. The main operative circuit is indicated by the heavy lines, see Fig. 1, and includes a battery or other source of current 90, and a conductor 91, having a connection to all the circuit-controllers, thence from the circuit-controller of wheel 36 by conductors 92, 93, to the controlling switch 46, thence through conductor 94, magnet 10, conductor 95, magnet 9, conductor 96, magnet 8, conductor 97, controlling-switch 45, conductor 98, controlling-switch 44, and conductor 99, to the recorder 42, and battery 90.

As the general operation of all of the switch-operating levers, is the same I shall describe the operation of but one of said levers. In the event of a condition of temperature in which all of the electro-magnets are energized, i. e., below the lowest temperature point, the previous operation, which energized the final electro-magnet, that is 8, operated the lever 18, drawing down or inward upon said lever through the movement of its armature lever 15. This displaced the frame 69 in such manner as to release the locking-lever 59, and the free end of the horizontal arm moving upward causes the inclined face 64 of bar 63 to engage the inclined face 66 of the projection 65, on the lever 18, and moves said lever farther inward to close the selecting-switch 48. The movement of the upper end of arm 60 of the locking-lever releases the train for operation, whereupon all of the wheels 30 to 34 and also the wheels 35 and 36 rotate. The rotation of wheel 36 immediately opens the circuit, and as each of the other circuits is open at such time at both the wheel controlled circuit-controllers and the selecting switches, it is obvious that the circuit controlled by the wheel 30 is the one that will cause operation of the recorder, as this is the only circuit in which the selecting-switch is closed. It will be noted in this connection that the bar 63, of the arm 62 of the locking lever is so disposed that when the switch operating levers are in normal position said bar can move across the faces of the projections 65, so that except in the instance of the particular lever actuated by the armature lever of the electro-magnet, the bars 63 will engage and thereby lock out all the other switch-operating levers, preventing any other circuit being operated.

With particular relation to the signals the device operates as follows:—Assuming the mercury of the thermostatic controller to have fallen below contact point 4, it will be obvious that all of the electro-magnets 8, 9, and 10, will be energized, because of the removal of the short circuit formed by the mercury column, and that the last movement will, by opening the circuit at point 4, have permitted the energization of electro-magnet 8. This operates the lever 18 and closes the selecting switch 48, and releases the gearing train whereupon the circuit-controller of wheel 30, will operate the circuit of the recorder. Now assuming the mercury to rise, said mercury column will engage contact-making point 4, short-circuiting electro-magnet 8 through conductors 11, 12, permitting retraction of armature-lever 15, which, as before described, operates switch-operating lever 19, and closes selecting-switch 49, of circuit-controller of wheel 31, designed to denote "low temperature rising." As the mercury continues to rise it engages contact-making point 5, short-circuiting electro-magnet 9 through conductors 12, 13, permitting the armature lever 16 to retract, operating switch-operating lever 20 to close the selecting-switch 50 of the circuit-controller of wheel 32, indicating normal temperature rising. A further increase of temperature short-circuits electro-magnet 10 through conductors 13, 14, by including contact-making point 6, permitting the armature-lever 17 to move to retracted position, operating switch-operating lever 22 of the circuit-controller of wheel 34 meaning high temperature rising. When the mercury is falling and again opens the circuit at point 6, magnet 10 becomes energized, attracting its armature and operating switch-operating lever 21, to close selecting switch 51, of the circuit-controller of wheel 33, to indicate "high temperature falling." The respective normal and low temperature points will, on being opened, energize their respective magnets, to close their own selecting-switches, and the lever 18 when operated by the armature-lever 15, on the attraction of its armature closing its selecting switch to indicate "low temperature falling."

The wheel 35 is, as previously described, controlled through a wheel 78, which latter wheel is arranged for slow rotation, and set so as to permit a certain number of rounds of the gearing, determined by the strength of the spring, to be produced without actuation of said wheel 35. After the certain number of rounds have been produced, the projection 80 of the lever 75 engages the projecting point of the dog 81, and on the next signaling operation and consequent rotation of wheel 78 the projection displaces the dog and opens the space in the flange 79, normally filled by the dog. As the lever 75 is, however, locked out by locking bar 69 until the completion of the signaling operation, no action of the lever 75 can occur, but as soon as said operation is completed and the lock removed the projection 80 actuated, by spring 77, rides into the space provided, closing contacts 74, and causing operation of wheel 35, and the consequent operation of the recorder to indicate that the apparatus needs rewinding. At the completion of the operation one of the lugs 86 moves into engagement with a projection 85 on lever 75 to return said lever to its normal position and thereby to permit the dog 81 to return to initial position under influence of spring 130

84 to close the opening in the flange. In winding the train, the wheel 78 revolves in the opposite direction, so that the projection 80 rides over the dog and does not displace it.

The locking-lever 59 is provided with an offset projection 87 having an inclined face designed to be engaged by an appropriately formed lug 88 on one of the wheels of the train, following a complete operation or indicating movement of the train to move the arm 60 to the right (Fig. 5) whereupon the end of said arm will be engaged by the lug 61 to lock the train against further movement, this movement of the locking lever causing it to be again engaged by the projection 71 of the frame 69 under the influence of a spring 89, whereby the train is again locked against movement pending a further operation. The lug 88 merely serves to return the locking lever to train-locking position.

The apparatus described provides a simple form of mechanism, complete in itself, adapted for the electrical transmission of any predetermined number of temperature changes, and which may by the obvious use of proper conductors be located at any desired distance from the thermostatic control, the apparatus permitting the use of a register or recorder to indicate the temperature changes, or the obvious substitution of audible or visible means in place of such recorder or register, for indicating the same.

I claim:—

1. A signaling apparatus for temperature indicators including a plurality of individualized circuit controllers, a plurality of circuits controlled thereby, said controllers being simultaneously operable for the transmission of signals over the circuits controlled thereby, and temperature controlled means to select a particular circuit for the transmission of a signal thereover.

2. A temperature indicating apparatus comprising a series of actuable individualized controllers, a series of circuits controlled thereby, each circuit having two normally open points, means controlled by the apparatus for closing one of the points, and means controlled by the temperature for closing the other of said points.

3. A signaling apparatus for temperature indicators including a plurality of individualized circuit controllers, a corresponding plurality of circuits controlled thereby, said controllers simultaneously operable for the transmission of signals over the circuits controlled thereby, and temperature controlled means governing the transmission of signals over all of said circuits and selecting a particular circuit for the effective transmission of a message thereover.

4. A signaling apparatus for temperature indicators comprising a motor driven series of individualized controllers simultaneously operable to control a plurality of circuits associated therewith for the transmission of signals thereover, a plurality of circuits controlled thereby, means for normally locking said controllers against movement, and temperature controlled means for releasing the locking means, and selecting a particular circuit for the transmission of a signal thereover.

5. A signaling apparatus for temperature indicators, comprising a motor driven series of individualized controllers, means for normally locking the controllers against movement, a series of circuits controlled by the controllers, an additional governing means for each circuit, and temperature controlled means for selectively operating a particular governing means and simultaneously releasing the locking means, said locking means locking out the remaining governing means.

6. A signaling apparatus for temperature indicators, comprising a series of temperature indicating individualized controllers, circuits controlled by said controllers, a motor driven train for operating the controllers, temperature governed means for selecting a particular circuit and controlling the train, a controller for indicating the condition of the motor driven train, and means automatically actuated after a predetermined number of operations of the train for permitting signal indicating operation of said last mentioned controller.

7. A signaling apparatus for temperature indicators, comprising a motor driven train, a plurality of individualized controllers operated thereby, circuits controlled thereby, means for normally locking the train against movement, a selecting switch in each circuit, a lever for each of said switches, and temperature controlled means for selectively operating a particular selecting switch operating lever and releasing the train locking means.

8. A signaling apparatus for temperature indicators, comprising a motor driven train, a plurality of individualized controllers operated thereby, circuits controlled thereby, a lever for normally locking the train against movement, a selecting switch in each signal circuit, an operating lever for each of said switches, means for normally holding the locking lever against releasing movement and adapted to be operated by any one of said switch levers, and temperature controlled means for selectively operating a particular switch lever.

9. A signaling apparatus for temperature indicators, comprising a motor driven train, a plurality of individualized controllers operated thereby, circuits controlled thereby, a lever for normally locking the train against movement, a selecting switch in each circuit, a lever for each of said switches, a series of electro-magnets, means controlled by the magnets for selectively operating a particular switch lever, and temperature controlled circuits for governing the magnets.

10. A signaling apparatus for temperature indicators, comprising a motor driven train, a plurality of individualized controllers operated thereby, circuits controlled thereby, a lever for normally locking the train against movement, a selecting switch in each circuit, a lever for each of said switches, a series of electro-magnets, means controlled by the magnets for selectively operating a particular switch lever, a normally closed main circuit including the electro-magnets, means for normally opening the main circuit in the initial operation of the train, and temperature controlled means for governing the condition of said electro-magnets.

11. Apparatus of the kind described, comprising individualized controllers, a main circuit associated therewith, a plurality of electro-magnets normally in series in said circuit, having means coactive therewith for controlling their selective action, and a thermal device having electrical connections to successively shunt said magnets from said circuit upon predetermined changes in temperature to thereby cause a corresponding operation of the individualized controllers.

In testimony whereof, I have signed my name to this specification, in the presence of two subscribing witnesses.

NATHAN H. SUREN.

Witnesses:
E. P. WALDRON,
C. C. BISSEFF.